Dec. 13, 1927.

L. W. AUGE 1,652,293

ELECTRICAL SWITCH

Filed April 28, 1921

Witness
Edwin L. Bradford

Inventor
Louis William Auge
By
Attorney

Patented Dec. 13, 1927.

1,652,293

UNITED STATES PATENT OFFICE.

LOUIS WILLIAM AUGE, OF RAHWAY, NEW JERSEY.

ELECTRICAL SWITCH.

Application filed April 28, 1921. Serial No. 465,189.

This invention relates to electric lighting systems, and in particular to the lighting systems of motor vehicles.

An important object of the invention is to provide for conveniently controlling the headlights i. e. changing from bright to dim and vice versa, without requiring the removal of the hands from the steering wheel of the motor vehicle.

The invention includes an improved switch capable of being mounted directly on the steering wheel in convenient reach of one of the hands of the driver whereby the switch may be actuated without removing either hand from the steering wheel.

According to the present invention, when the lighting system is on, the instrument board light and the tail-light are always in circuit regardless of the changing of the conditions of the headlight, and when the switch is manipulated to put out the instrument board light and the tail light, all lights are off. The push buttons or push elements for controlling the conditions of the headlights are associated so that when either of said elements is manually moved to close one of the circuits, the other element is moved to open the other circuit, whereby the changing from bright to dim and vice versa is quickly accomplished by the operation of a single element, thereby reducing to the minimum the dark period which ordinarily occurs in changing from bright to dim and vice versa.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

Figure 1:
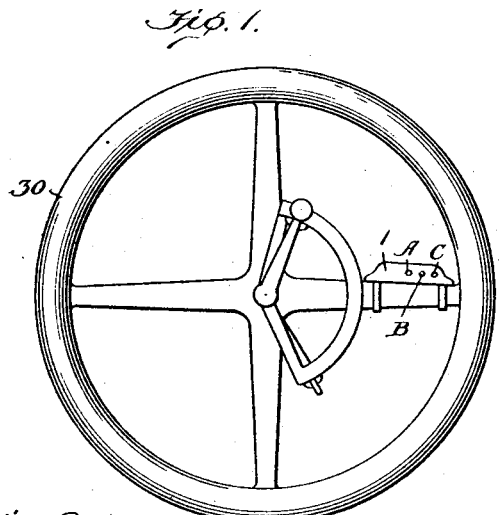
Figure 1 is a plan view of a steering wheel with the switch of the present invention applied thereto.

The switch of the present invention includes a base or body 1 of wood or other non-conducting material. Working endwise through suitable openings in the base or body are the push elements A, B and C, each of which is in the form of a cylindrical plunger having an enlarged head at its outer end operating as a stop for engagement with the body 1 to limit endwise movement of the plunger in one direction.

The body of the plunger A is formed of non-conducting material and is provided with a reduced shank 2, of metal or other suitable conducting material, said shank being provided at its outer end with a lateral projection or enlargement 3. The opposite side of the shank is provided with the notches or seats 4 and 5. At one side of the shank there is a substantially L-shaped contact member 6 having a depending free arm which is resilient and disposed in the path of the projection 3. At the opposite side of the shank is another contact member 7. Each of the contact members is secured to the underside of the base or body 1 by a suitable fastening, such as a screw indicated at 8. The contact 7 has its depending free arm bent to form a substantially V-shaped lateral projection 9 normally in frictional contact with the shank 2 and designed to snap into the respective seats 4 and 5 to limit the movement of the plunger in opposite directions.

As the plungers B and C are duplicates in construction and operation, a detailed description of one of them is deemed sufficient. Referring to Figure 5, it will be seen that the plunger C is provided with a shank 10 of conducting material, and at opposite sides of the shank are contact members 11 and 12 corresponding to the contact members 6 and 7 shown in Figure 6. Each of these contact members is connected to the body 1 by a suitable fastening 8. The depending arm of the contact 11 is provided at its lower end with a foot or lateral projection 13 underlying the bottom of the shank 10 and in the path thereof so as to close an electric circuit when the shank and the projection 13 come into contact. The contact 12 is provided with a substantially V-shaped shoulder or projection 14 in frictional engagement with the shank 10 and designed to snap into the respective notches 15 and 16 in the shank to limit endwise movement of the entire plunger in opposite directions. It will here be explained that the contact 9 and the contacts 12 are all on one and the same side of the respective plungers, as will be understood by reference to Figure 4 of the drawing, the sectional views 5 and 6 being taken in opposite directions.

As hereinbefore indicated, the plungers B and C are connected or associated so that one of them will be moved to its withdrawn position when the other is pushed to its inner position, and this operation is accomplished in the following manner. The shanks 10 of the plungers B and C are connected by a pair of substantially parallel rocker links 17 and 18, each of which is in the form of a plate provided at each end with a longitudinal slot or bifurcation 19 receiving a reduced portion of the adjacent shank 10. The reduced portion of the shank is produced by notches formed in opposite sides of the shank, the top and bottom walls of each notch being substantially V-shaped as indicated at 20 and 21 so as to produce in effect knife edge bearings engaging the tops and bottoms of the rocker bar portions which engage the notches in the shanks. The rocker bars are received between a pair of spaced hangers or brackets 22 depending from the base or body 1 and provided with a cross bar 23 lying between the rocker bars 17 and 18.

Figure 4:
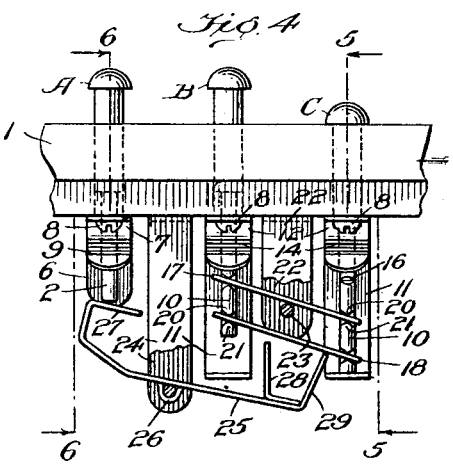
Figure 4 is an enlarged side elevation showing the operating parts of the present switch.
Figure 5:
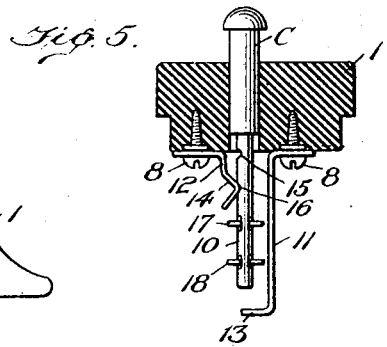
Figure 5 is a cross sectional view on the line 5—5 of Figure 4.
Figure 3:
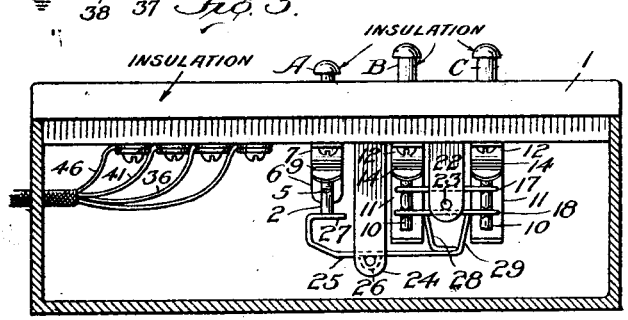
Figure 3 is a side elevation of the present switch, with the casing broken away.

As thus far described, the cooperative action of the plungers B and C will be understood by reference to Figures 3 and 4. As indicated in Figure 3, the plungers B and C are each at its outer limit, the rocker bars 17 and 18 are substantially horizontal, and the lower rocker bar 18 is adjacent or in contact with the cross bar 23. On pressing downwardly upon the plunger C, the ends of the rocker bars associated with C will move downwardly to the positions shown in Figure 4, said rocker bars rocking on their bearings on the shank of the plunger B, the latter being held against downward displacement by the resilient contact member 14 engaging the notch 16 in the shank and maintaining the plunger B in its outer or upper position. It will therefore be understood that the part 14 not only constitutes an electrical contact but also constitutes means for holding the plunger B against downward movement when the plunger C is forced downwardly. In Figure 4 it will be noted that the upper rocker bar 17 has been moved downwardly in contact with the cross bar or abutment 23, so that when the plunger B is forced inwardly or downwardly, the rock bar 17 will be rocked on the part 23 as a fulcrum, whereby the plunger C will be elevated when the plunger B is depressed. It will of course be understood that the positions of all of the moving parts are reversed when the plunger B has been depressed.

The plungers B and C as a pair are associated with the plunger A so that there is mutual control of each by the other, accomplished in the following manner. Depending from the base or body 1 and disposed between the plunger A and the adjacent plunger B are hangers or bracket arms 24 between which extends a rocker arm or arm 25 fulcrumed between its ends as at 26 upon said bracket arms. One end of the rocker arm 25 underlies the plunger A and is provided with a transverse shoulder 27 lying against or in close proximity to the lower end of the shank of the plunger. The other end of the rocker bar 25 is provided with a pair of upstanding fingers or projections 28 and 29 underlying and in close proximity to the rocker bar 18.

With the parts arranged as shown in Figure 3, the plunger A being pushed in, the plungers B and C being pushed out and each of the three rocker bars being in a substantially horizontal disposition, the several electric circuits, which will hereinafter be described, are all open as will be understood by reference to Figures 5 and 6, because the shanks 15 of the plungers B and C are out of engagement with their respective contacts 13, and the shank of the plunger A is out of engagement with its contact 6. By pressing downwardly upon either of the plungers B or C, the rocker bars 17 and 18 will be rocked, and the lower rocker bar 18 comes into engagement with one or the other of the shoulders or projections 28 and 29 on the rocker 25, whereby the latter will be rocked so that its shoulder 27 will push upwardly the plunger A until its shank portion 3 comes into engagement with the contact 6 and the spring contact 9 is snapped into the seat 5, whereupon the circuit controlled by the plunger A will be closed, and another circuit will be closed, according to which of the plungers B or C has been depressed, and the bottom of its shank brought into engagement with the foot or projection 13 of its contact member 11.

In the position of the parts as shown in Figure 4, the circuits controlled by the plungers A and C will be closed, while the circuit controlled by the plunger B is open. Downward pressure upon the plunger B to close its circuit will effect an upward movement of the plunger C and a consequent opening of the circuit controlled by the plunger C. When the plunger B is depressed, the rocker bar 17 will immediately start to elevate the plunger C, and the right hand end of the rocker 18 will be lifted by the shank of the plunger C, and the left hand end of the rocker 18 will be lowered by the shank of the plunger B, such operation of the rocker 18 having no effect to disturb the rocker 25 which will remain in its inclined position with its shoulder 27 adjacent to or in contact with the shank of the plunger A.

With the plunger C depressed as in Figure 4, depression of the plunger A will move the plunger C to its outer position, through the operation of the rocker 25, and then the parts will be in the positions shown in Figure 3 which is the normal position of the parts with all circuits open.

In the practical application of the present switch to automobile lighting systems, I propose to mount the switch on the steering wheel, a conventional form of which has been shown at 30 in Figure 1 of the drawing. The switch may be clipped or otherwise secured to one of the spokes of the wheel or to the rim thereof as desired. By reference to Figure 2 of the drawings, it will be seen that the contacts 9 and 12 are associated with a conductor 31 carried by the base 1 and leading from a binding post 32, the latter being connected to a battery 33 which is in turn grounded in the usual manner. A conductor 34 leads from the contact 6 to a binding post 35, from which leads a conductor 36 which is grounded as shown and has included therein lights, such for instance as an instrument board light 37 and a tail-light 38. The contact 11 of the plunger B is associated with a conductor 39 leading to a binding post 40 from which a conductor 41 leads to dimmer lights 42, each of which is grounded in the usual manner. From the contact 11 of the plunger C a conductor 44 leads to a binding post 45 from which a conductor 46 leads to headlights 47 which are grounded in the usual manner.

Figure 2:
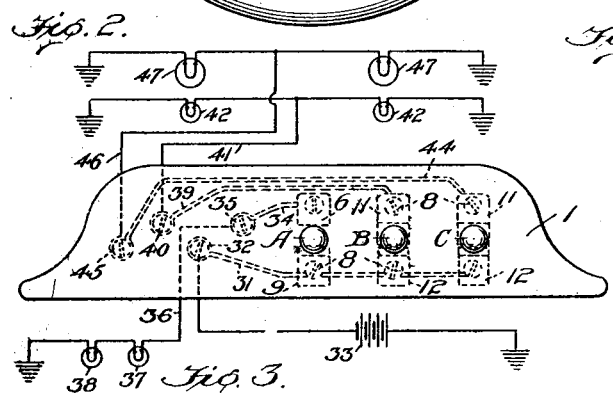
Figure 2 is a diagrammatic view of a conventional form of an electric lighting system for motor vehicles having the switch of the present invention incorporated therein.
Figure 6:
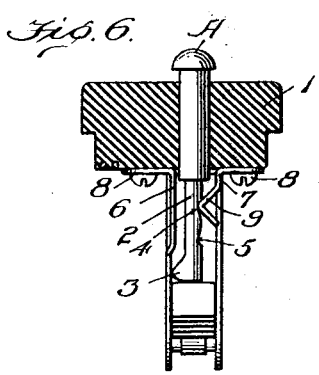
Figure 6 is a cross sectional view on the line 6—6 of Figure 4.
Figure 7:
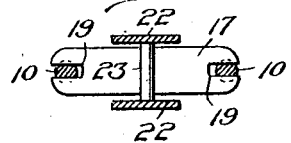
Figure 7 is a fragmentary sectional view of a detail.

With the switch incorporated in electric circuits, as shown in Figure 2, it will be seen that with the plunger A pushed downwardly as in Figures 3 and 6, the circuit including the instrument board light 37 and the tail-light 38 is open. The pushing down of the plunger A lifts the plungers B and C, each of which will have the position as shown in Figure 5 of the drawing, whereby the headlight circuit and the dimmer circuit will each be open. By pressing downwardly upon the plunger C, the headlight circuit may be closed so as to produce a bright headlight and at the same time the rocker arm 25 will be actuated, the plunger A elevated and its circuit closed to energize the tail-light and the instrument board light. By pressing downwardly upon the plunger B, which will in turn elevate the plunger C, the bright headlight circuit will be opened and the dimmer circuit will be closed thereby changing practically instantaneously from bright to dim and reducing to the minimum the usual dark period occurring between said changes.

With all of the circuits open, the instrument board light and the tail-light may be energized by lifting the plunger A without actuating the other plungers, as will be readily understood by reference to Figure 3 of the drawing.

What is claimed is:

1. In a switch mechanism, the combination with a plurality of positively movable plungers forming switch members, contacts provided for cooperation with each of said plungers, means associated with two of said plungers, which make contact when moved in one direction, to effect the reverse operation of one by the positive operation of the other, and means associated with a third plunger, which makes contact when moved in the opposite direction, said last named means being adapted to be operated by said third plunger to cause a reverse operation of either of said first two plungers, said means also being adapted to be reversely operated by either of said first two plungers.

2. In a switch mechanism, the combination with a plurality of positively movable plungers forming switch members, contacts provided for cooperation with each of said plungers, all of said plungers being adapted to be spaced from said contacts upon the positive operation of one of said plungers, means associated with two other of said plungers for causing a reverse operation of one upon a positive operation of the other, and means associated with all three of said plungers whereby a positive operation of either of said two plungers causes said first named plunger to engage with its contact.

3. In combination, a switch mechanism including a plurality of positively operated plungers and contacts provided for cooperation with each of said plungers, two of said plungers being associated to effect reverse operation of either plunger by the operation of the other, and a third plunger being associated with said two plungers to effect reverse operation of either the third plunger or the said two plungers as a unit by the selective operation of either of said two plungers or said third plunger.

4. In a switch mechanism, the combination of a plurality of positively actuated switch members, contacts provided for each of said switch members, a rocker connection for two of the switch members, and a rocker connection between the third switch member and the rocker connection of said two switch members for returning either of said first two switch members to open position.

5. In a switch mechanism, the combination of a plurality of positively actuated plunger switches, a pair of spaced rockers connecting two of the plunger switches, a fulcrum disposed between the spaced rockers with which said rockers successively engage, and another rocker fulcrumed between its ends and having its ends associated with the third plunger and one of said pair of rockers respectively.

6. In a switch mechanism, the combination of a plurality of positively actuated plunger switches and cooperating contacts for each of said switches, a pair of spaced rockers connecting two of the plunger switches, a fulcrum disposed between the spaced rockers and with which said rockers successively engage, and another rocker fulcrumed between its ends and having one end associated with a third plunger and the other end with one of said pair of rockers respectively, said third plunger being capable of being withdrawn from its rocker without actuating the same.

7. An electric switch comprising a base, three plungers working therethrough, inner and outer contacts for each plunger, rocker means connecting a pair of plungers for mutual operation in opposite directions, a bracket carried by the base and having a fulcrum for said rocker means, another bracket on said base, and another rocker fulcrumed on said other bracket and having its ends associated with the rocker means of the said pair of plungers and the third plunger respectively for returning either of said pair of plungers to initial position.

In testimony whereof, I affix my signature.

LOUIS WILLIAM AUGE.